US010240934B2

(12) United States Patent
Miksa et al.

(10) Patent No.: US 10,240,934 B2
(45) Date of Patent: Mar. 26, 2019

(54) METHOD AND SYSTEM FOR DETERMINING A POSITION RELATIVE TO A DIGITAL MAP

(71) Applicant: TomTom Global Content B.V., Amsterdam (NL)

(72) Inventors: Krzysztof Miksa, Lodz (PL); Rafal Jan Gliszczynski, Lodz (PL); Blazej Kubiak, Lodz (PL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 0 days.

(21) Appl. No.: 15/307,393

(22) PCT Filed: Apr. 30, 2015

(86) PCT No.: PCT/EP2015/059614
§ 371 (c)(1),
(2) Date: Oct. 28, 2016

(87) PCT Pub. No.: WO2015/173034
PCT Pub. Date: Nov. 19, 2015

(65) Prior Publication Data
US 2017/0052032 A1    Feb. 23, 2017

(30) Foreign Application Priority Data
Apr. 30, 2014    (GB) .................................. 1407643.4

(51) Int. Cl.
*G01C 21/30* (2006.01)
*H04N 13/00* (2018.01)
(Continued)

(52) U.S. Cl.
CPC ............. *G01C 21/30* (2013.01); *G01C 21/28* (2013.01); *G06T 7/50* (2017.01); *G06T 2207/10004* (2013.01); *G06T 2207/30252* (2013.01)

(58) Field of Classification Search
CPC ...... G01C 21/28; G01C 15/002; G01C 21/30; G06K 9/00369; G06K 9/00805;
(Continued)

(56) References Cited

U.S. PATENT DOCUMENTS

| 4,700,307 A | 10/1987 | Mons et al. |
| 5,684,695 A | 11/1997 | Bauer |

(Continued)

FOREIGN PATENT DOCUMENTS

| CN | 102317954 A | 1/2012 |
| CN | 103278170 A | 9/2013 |

(Continued)

OTHER PUBLICATIONS

Barth A., Siegemund J., and J. Schwehr, 2013: Fast and Precise Localization at Stop Intersections, in Proc. of the IEEE Intelligent Vehicles Symposium, 2013, pp. 75-80.

(Continued)

*Primary Examiner* — Yuri Kan

(57) ABSTRACT

A method of determining a longitudinal position of a vehicle (100) relative to a digital map is disclosed in which real time scan data (200, 202) is determined by scanning a lateral environment around the vehicle using at least one rangefinder sensor, said real time scan data comprising one or more depth maps, each depth map representing the measured lateral distance to surfaces in the lateral environment for a plurality of longitudinal positions and elevations. Localization reference data associated with the digital map for a deemed current longitudinal position of the vehicle (Continued)

(100) in relation to the digital map is retrieved, and compared to the real time scan data (200, 202) by calculating a cross-correlation to determine a longitudinal offset. The deemed current longitudinal position is adjusted based on said longitudinal offset to determine the longitudinal position of the vehicle (100) relative to the digital map.

13 Claims, 11 Drawing Sheets

(51) Int. Cl.
G01C 21/28 (2006.01)
G06T 7/50 (2017.01)
(58) Field of Classification Search
CPC ........ G06K 9/46; G06K 9/00; H04N 13/0022; H04N 13/004; H04N 13/00; H04N 7/18; G06Q 10/06; G08B 13/1963; G01S 7/4802; G01S 17/58; B60N 2/2863; G06T 19/006; G06T 5/002; G06T 7/254; G06T 15/00; G03H 1/08
See application file for complete search history.

(56) References Cited

U.S. PATENT DOCUMENTS

| | | | |
|---|---|---|---|
| 5,893,043 A | 4/1999 | Moehlenbrink et al. | |
| 5,961,571 A | 10/1999 | Gorr et al. | |
| 6,047,234 A | 4/2000 | Cherveny et al. | |
| 6,138,062 A | 10/2000 | Usami | |
| 6,233,361 B1* | 5/2001 | Downs | G01S 7/4802 348/E5.064 |
| 6,266,442 B1 | 7/2001 | Laumeyer et al. | |
| 6,363,161 B2 | 3/2002 | Laumeyer et al. | |
| 6,449,384 B2 | 9/2002 | Laumeyer et al. | |
| 6,453,056 B2 | 9/2002 | Laumeyer et al. | |
| 6,453,223 B1 | 9/2002 | Kelly | |
| 6,516,267 B1 | 2/2003 | Cherveny et al. | |
| 6,526,352 B1 | 2/2003 | Breed | |
| 6,608,913 B1 | 8/2003 | Hinton | |
| 6,625,315 B2 | 9/2003 | Laumeyer et al. | |
| 6,671,615 B1 | 12/2003 | Becker et al. | |
| 6,728,608 B2 | 4/2004 | Ollis | |
| 6,745,123 B1 | 6/2004 | Petzold et al. | |
| 6,836,724 B2 | 12/2004 | Becker et al. | |
| 6,847,887 B1 | 1/2005 | Casino | |
| 6,847,906 B2 | 1/2005 | Ozawa | |
| 6,856,897 B1 | 2/2005 | Phuyal et al. | |
| 6,990,407 B1 | 1/2006 | Mbekeani et al. | |
| 7,035,733 B1 | 4/2006 | Alwar et al. | |
| 7,050,903 B1 | 4/2006 | Shutter et al. | |
| 7,085,637 B2 | 8/2006 | Breed et al. | |
| 7,092,548 B2 | 8/2006 | Laumeyer et al. | |
| 7,096,115 B1 | 8/2006 | Groth et al. | |
| 7,098,909 B2 | 8/2006 | Hayano | |
| 7,139,659 B2 | 11/2006 | Mbekeani et al. | |
| 7,251,558 B1 | 7/2007 | McGrath | |
| 7,269,503 B2 | 9/2007 | McGrath | |
| 7,307,513 B2 | 12/2007 | Shutter et al. | |
| 7,392,151 B2 | 6/2008 | Makela | |
| 7,398,154 B2 | 7/2008 | Phuyal et al. | |
| 7,418,346 B2 | 8/2008 | Breed et al. | |
| 7,433,889 B1 | 10/2008 | Barton | |
| 7,444,003 B2 | 10/2008 | Laumeyer et al. | |
| 8,244,457 B2 | 8/2012 | Milark | |
| 8,301,374 B2 | 10/2012 | Surampudi | |
| 8,588,471 B2 | 11/2013 | Hsieh | |
| 8,630,805 B2 | 1/2014 | Becker | |
| 9,140,792 B2 | 9/2015 | Zeng | |
| 9,194,949 B2 | 11/2015 | Becker | |
| 2004/0041805 A1 | 3/2004 | Hayano | |
| 2005/0060069 A1 | 3/2005 | Breed et al. | |
| 2005/0149251 A1 | 7/2005 | Donath et al. | |
| 2007/0021915 A1* | 1/2007 | Breed | B60N 2/2863 701/301 |
| 2007/0055441 A1 | 3/2007 | Retierath et al. | |
| 2009/0086022 A1* | 4/2009 | Finn | G08B 13/1963 348/143 |
| 2009/0228204 A1 | 9/2009 | Zavoli | |
| 2010/0183192 A1* | 7/2010 | Fritsch | G06T 7/254 382/103 |
| 2011/0054791 A1 | 3/2011 | Surampudi | |
| 2011/0109745 A1 | 5/2011 | Nakatani | |
| 2011/0178610 A1* | 7/2011 | O'Connor | G06Q 10/06 700/30 |
| 2011/0255741 A1* | 10/2011 | Jung | G06K 9/00369 382/103 |
| 2011/0293137 A1* | 12/2011 | Gurman | G06K 9/00201 382/103 |
| 2012/0044241 A1* | 2/2012 | Chen | G06T 11/00 345/419 |
| 2012/0310516 A1 | 12/2012 | Zeng | |
| 2013/0103298 A1 | 4/2013 | Becker | |
| 2013/0121562 A1* | 5/2013 | Barnum | G06K 9/46 382/154 |
| 2013/0135435 A1* | 5/2013 | D'Amato | H04N 13/183 348/43 |
| 2013/0155058 A1* | 6/2013 | Golparvar-Fard | G06T 19/006 345/419 |
| 2014/0028678 A1* | 1/2014 | Chmielewski | G06T 5/002 345/426 |
| 2014/0118716 A1* | 5/2014 | Kaganovich | G01S 17/89 356/4.01 |
| 2015/0261184 A1* | 9/2015 | Mannion | G06T 17/00 348/41 |

FOREIGN PATENT DOCUMENTS

| | | | |
|---|---|---|---|
| DE | 10202756 A1 | 7/2003 | |
| DE | 102005008185 A1 | 8/2006 | |
| DE | 102004055069 B4 | 2/2007 | |
| DE | 102009009047 A1 * | 8/2010 | ......... G06K 9/00805 |
| EP | 1734341 A1 | 12/2006 | |
| EP | 2034271 A1 | 3/2009 | |
| EP | 2372309 A2 | 10/2011 | |
| JP | 2008076252 A | 4/2008 | |
| WO | 0148683 A1 | 7/2001 | |
| WO | 02097195 A2 | 12/2002 | |
| WO | 2006132522 A1 | 12/2006 | |
| WO | 2007011522 A2 | 1/2007 | |
| WO | 2007148546 A1 | 12/2007 | |
| WO | 2008002126 A1 | 1/2008 | |
| WO | 2008003272 A1 | 1/2008 | |
| WO | 20080118578 A2 | 10/2008 | |
| WO | 2008150153 A1 | 12/2008 | |
| WO | 20090098154 A1 | 8/2009 | |
| WO | 20110023246 A1 | 3/2011 | |
| WO | WO-2011023246 A1 * | 3/2011 | ........... G01C 15/002 |
| WO | WO-2012089263 * | 7/2012 | |

OTHER PUBLICATIONS

Brenner C., 2010: Vehicle localization using landmarks obtained by a LIDAR mobile mapping system, Proceedings of the ISPRS Commission III Symposium on Photogrammetric Computer Vision and Image Analysis, Paris, pp. 139-144.

Hofman S., Schulze M.J., Sester M., and C. Brenner, 2011: Quality Assessment of landmark based positioning using stereo cameras, in Stilla U. et al. PIA11—International Archives of Photogrammetry, Remote Sensing and Spatial Information Sciences, pp. 85-90.

Pfaffenholz, J.A., Brenner C., and M. Sester, 2012: Collaborative positioning using landmark maps. ACM SIGSPATIAL IWTC 2012.

Schindler, A. 2013: Vehicle Self-localization with High-Precision Digital Maps, in Proc. of the IEEE Intelligent Vehicles Symposium 2013, pp. 141-146.

Schubert R., Schlingelhof M., Cramer H. and G. Wanielik, 2007: Accurate Positioning for Vehicular Safety Applications—The SAFESPOT Approach, Vehicular Technology Conference, 2007. VTC2007—Spring. IEEE 65th, pp. 2506-2510.

(56) References Cited

OTHER PUBLICATIONS

T'Siobbel S., 2004: Mobile Mapping Matters, Proceeding ITS World Congress, Nagoya 2004.
K. Miksa, R. Gliszczynski, B. Kubiak, K. Kudrynski, H. Clauss, S. T'Siobbel, and F. Ballegeer., Enhanced Digital Map Data to Support Highly Accurate Vehicle Localization, a Requirement for Highly Automated Driving, 22nd ITS World Congress, Bordeaux, France, Oct. 5-9, 2015.
International Search Report dated Aug. 21, 2015 for application No. PCT/EP2015/059614.
U.S. Appl. 61/236,547 to Velde et al., as published by WIPO on Mar. 3, 2011, 104 pages.
McCarthy, P.L. et al, "Shaft or Decline? An Economic Comparison", Open Pit to Underground: Making the Transition, AIG Bulletin 14, 1993, pp. 45-56.
Borenstein, J. et al, Chapter 8, "Where am I? Sensors and methods for mobile robot positioning", University of Michigan, Apr. 1996, downloaded from: http://www-personal.umich.edu/-johannb/Papers/pos96rep.pdf.
Weiß, Gerhard, "Keeping track of position and orientation of moving indoor systems by correlation of range-finder scans", Proceedings of the IEEE/RSJ/GI International Conference on Intelligent Robots and Systems '94. 'Advanced Robotic Systems and the Real World', I ROS '94, Sep. 12-16, 1994, vol. 1, pp. 595-601.
International Search Report dated Oct. 1, 2008 for International Application No. PCT/US08/54598.
International Search Report dated Aug. 6, 2007 for International Application No. PCT/NL06/050277.
Goodwin Cecil "U.S. CICAS-V Project Comparison with SAFESPOT" Feb. 1, 2008.
Bartels, Christine, "Cooperative Systems in Europe—The SAFESPOT Approach," Feb. 1, 2008.
"Cooperative vehicles and road infrastructure for road safety," SAFESPOT Integrated Project, http://www.safespot-eu.org/.
"Use cases, functional specifications and safety margin applications for the SAFESPOT Project," SP8-HOLA-SP Horizontal Activities, SAFESPOT Cooperative Systems for Roadway Safety, pp. 1-54.
"Follow the Virtual Cable®—it is safe, simple and intuitive," http://www.mvs.net/index.html.
"SAFEPROBE—In-vehicle sensing and platform," http://www.safespoteu-org/pages/page.php?mm=2&sm= 1.
Patel, Nila Y, "Virtual Cable nav system superimposes route guidance on your windshield in 3D," Dec. 17, 2007, http://www.engadget.com/2007 112117 /virtual-cable-navigation-systemsuperimposes-directions-on-your.
Gregoire, Normand, et al., "Hausdorff distance between convex polygons," http://cgm.cs.mcgill.ca/-godfried/teaching/cg-projects/98/normand/main.html.
National Highway Traffic Safety Administration,"Cooperative Intersection Collision Avoidance System Limited to Stop Sign and Traffic Signal Violations," Midterm Phase I Report, May 2006-Apr. 2007, Oct. 2008, pp. 1-41, DOT HS 811 048.
Cooperative Intersection Collision Avoidance System—Stop Sign Assist (CICAS-SSA), Concept of Operations, Version 1.0, Mar. 18, 2008, pp. 1-34.
Cooperative Intersection Collision Avoidance Systems (CICAS), Research and Innovative Technology Administration (RITA).
Motsinger, Caitlin, et al., "Technical Report: CVEL-07-003—A Review of Vehicle-to-Vehicle and Vehicle-to-Infrastructure Initiatives," CVEL, Oct. 3, 2007.

\* cited by examiner

METHOD AND SYSTEM FOR DETERMINING A POSITION RELATIVE TO A DIGITAL MAP

CROSS-REFERENCE TO RELATED APPLICATIONS

The present application is a National Stage of International Application No. PCT/EP2015/059614, filed on Apr. 30, 2015, and designating the United States, which claims benefit to United Kingdom Patent Application 1407643.4 filed on Apr. 30, 2014. The entire content of these applications is incorporated herein by reference.

FIELD OF THE INVENTION

This invention relates to methods and systems for improved positioning accuracy relative to a digital map, and which is needed for highly and fully automated driving applications. More specifically, embodiments of the invention, relate to the generation of reference data (e.g. through crowd sourcing techniques), the format of the reference data, and the use of the reference data through a comparison to sensed data from a vehicle to accurately position the vehicle on the digital map.

BACKGROUND OF THE INVENTION

It has become common in recent years for vehicles to be equipped with navigation devices, either in the form of portable navigation devices (PNDs) that can be removably positioned within the vehicle or systems that are integrated into the vehicle. These navigation devices comprise a means for determining the current position of the device; typically a global navigation satellite system (GNSS) receiver, such as GPS or GLONASS. It will be appreciated, however, that other means may be used, such as using the mobile telecommunications network, surface beacons or the like.

Navigation devices also have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc. For the purposes of this application, a digital map of this form will be referred to as a "standard map".

Navigation devices are arranged to be able to use the current position of the device, together with the standard map, to perform a number of tasks, such as guidance with respect to a determined route, and the provision of traffic and travel information relative to the current position or predicted future position based on a determined route.

It has been recognised, however, that the data contained within standard maps is insufficient for various next generation applications, such as highly automated driving in which the vehicle is able to automatically control, for example, acceleration, braking and steering without input from the driver, and even fully automated "self-driving" vehicles. For such applications, a more precise digital map is needed. This more detailed digital map typically comprises a three-dimensional vector model in which each lane of a road is represented separately, together with connectivity data to other lanes. For the purposes of this application, a digital map of this form will be referred to as a "planning map" or "high definition (HD) map".

An representation of a portion of a planning map is shown in FIG. 1, wherein each line represents the centreline of a lane. FIG. 2 shows another exemplary portion of a planning map, but this time overlaid on an image of the road network. The data within these maps is typically accurate to within a meter, or even less, and can be collected using various techniques.

One exemplary technique for collecting the data to build such planning maps is to use mobile mapping systems; an example of which is depicted in FIG. 3. The mobile mapping system 2 comprises a survey vehicle 4, a digital camera 40 and a laser scanner 6 mounted on the roof 8 of the vehicle 4. The survey vehicle 2 further comprises a processor 10, a memory 12 and a transceiver 14. In addition, the survey vehicle 2 comprises an absolute positioning device 2, such as a GNSS receiver, and a relative positioning device 22 including an inertial measurement unit (IMU) and a distance measurement instrument (DMI). The absolute positioning device 20 provides geographical coordinates of the vehicle, and the relative positioning device 22 serves to enhance the accuracy of the coordinates measured by the absolute positioning device 20 (and to replace the absolute positioning device in those instances when signals from the navigation satellites cannot be received). The laser scanner 6, the camera 40, the memory 12, the transceiver 14, the absolute positioning device 20 and the relative positioning device 22 are all configured for communication with the processor 10 (as indicated by lines 24). The laser scanner 6 is configured to scan a laser beam in 3D across the environment and to create a point cloud representative of the environment; each point indicating the position of a surface of an object from which the laser beam is reflected. The laser scanner 6 is also configured as a time-of-flight laser range-finder so as to measure a distance to each position of incidence of the laser beam on the object surface.

In use, as shown in FIG. 4, the survey vehicle 4 travels along a road 30 comprising a surface 32 having road markings 34 painted thereon. The processor 10 determines the position and the orientation of the vehicle 4 at any instant of time from position and orientation data measured using the absolute positioning device 20 and the relative positioning device 22, and stores the data in the memory 12 with suitable timestamps. In addition, the camera 40 repeatedly captures images of the road surface 32 to provide a plurality of road surface images; the processor 10 adding a timestamp to each image and storing the images in the memory 12. The laser scanner 6 also repeatedly scans the surface 32 to provide at least a plurality of measured distance values; the processor adding a timestamp to each distance value and stores them in the memory 12. Examples of the data obtained from the laser scanner 6 are shown in FIGS. 5 and 6. FIG. 5 shows a 3D view, and FIG. 6 shows a side view projection; the colour in each picture being representative of the distance to the road. All the data obtained from these mobile mapping vehicles can be analysed and used to create planning maps of the portions of the navigable (or road) network travelled by the vehicles.

It has been recognised by the Applicant that in order to use such planning maps for highly and fully automated driving applications, it is necessary to know the position of a vehicle relative to the planning map to a high degree of accuracy. The traditional technique of determining the current location of a device using navigation satellites or terrestrial beacons provides an absolute position of the device to an accuracy of around 5-10 meters; this absolute position is then matched to a corresponding position on the digital map. While this level of accuracy is sufficient for most traditional applications, it is not sufficiently accurate for next generations applications, where positions relative to the digital map are required at sub-meter accuracy even when travelling at high speeds on the road network. An improved positioning method is therefore required.

SUMMARY OF THE INVENTION

In accordance with a first aspect of the present invention there is provided a method of continually determining a longitudinal position of a vehicle relative to a digital map; the digital map comprising data representative of navigable elements (e.g. roads) of a navigable network (e.g. road network) along which the vehicle is travelling. The method comprises receiving real time scan data obtained by scanning a lateral environment around the vehicle; retrieving localisation reference scan data associated with the digital map for a deemed current longitudinal position of the vehicle in relation to the digital map, wherein the localisation reference scan data comprises a reference scan of the lateral environment around the deemed current longitudinal position, optionally wherein said reference scan has been obtained throughout the digital map from at least one device which has previously travelled along the route; comparing the real time scan data to the localisation reference scan data to determine a longitudinal offset between the real time scan data and the localisation reference scan data; and adjusting the deemed current longitudinal position based on said longitudinal offset.

Thus, in accordance with the first aspect of the present invention, the position of the vehicle relative to the digital map can therefore always be known to a high degree of accuracy. Examples in the prior art have attempted to determine the position of a vehicle by comparing collected data with known reference data for pre-determined landmarks along a route. However, the landmarks may be sparsely distributed on many routes, resulting in significant errors in the estimation of the vehicle's position when it is travelling between the landmarks. This is a problem in situations such as highly automated driving systems, where such errors can cause catastrophic consequences such as vehicle crash incidents resulting in serious injury or loss of life. The first aspect of the present invention solves this problem by having reference scan data throughout the digital map and by scanning the lateral environment around the vehicle in real time. In this way, the first aspect of the present invention allows real time scan and reference data to be compared such that the position of the vehicle relative to the digital map is always known to a high degree of accuracy.

The deemed current longitudinal position can be obtained, at least initially, from an absolute positioning system, such as a satellite navigation device, such as GPS, GLONASS, the European Galileo positioning system, COMPASS positioning system or IRNSS (Indian Regional Navigational Satellite System). It will be appreciated, however, that other location determining means can be used, such as using the mobile telecommunications, surface beacons or the like.

The digital map may comprise a three dimensional vector model representing the navigable elements of the navigable network, e.g. roads of the road network, in which each lane of the navigable elements, e.g. roads, are represented separately. Thus, a lateral position of the vehicle on the road may be known by determining the lane in which the vehicle is travelling. In other embodiments, the lateral position of the vehicle can be determined using a comparison of the real time scan data with the retrieved localisation reference data, as is discussed in more detail below.

The real time scan data may be obtained on a left side of the vehicle and a right side of the vehicle. This helps to reduce the effect of transient features on the position estimation. Such transient features may be, for example, parked vehicles, overtaking vehicles or vehicles travelling the same route in the opposite direction. Thus, real time scan data can record features present on both sides of the vehicle. In some embodiments, the real time scan data may be obtained from either a left side of the vehicle or a right side of the vehicle.

The localisation reference data may comprise a reference scan of the lateral environment on a left side of the navigable element and a right side of the navigable element, and the localisation reference data for each side of the navigable element may be stored in a combined data set. Thus, the data from multiple parts of the navigable network may be stored together in an efficient data format. The data stored in the combined data set may be compressed, allowing data for more parts of the navigable network to be stored within the same storage capacity. Data compression will also allow a reduced network bandwidth to be used should the reference scan data be transmitted to the vehicle over a wireless network connection.

The comparison of the real time scan data from the left side of the vehicle with the localisation reference data from the left side of the navigable element and the comparison of the real time scan data from the right side of the vehicle with the localisation reference data from the right side of the navigable element may be a single comparison. Thus, when the scan data comprises data from the left side of the navigable element and data from the right side of the navigable element, the scan data may be compared as a single data set, significantly reducing the processing requirements compared to where the comparison for the left side of the navigable element and the comparison for the right side of the navigable element are performed separately.

The longitudinal position of the vehicle in relation to the digital map may always be known to sub-meter accuracy. Thus, in some embodiments, the present invention is particularly suitable to applications requiring high accuracy position estimates, such as highly automated driving.

Comparing the real time scan data to the localisation reference data may comprise calculating a cross-correlation, preferably a normalised cross-correlation, between the real time scan data and the localisation reference data.

The comparison of the real time scan data to the localisation reference data may be performed over a window of longitudinal data. Thus, windowing the data allows the comparison to take account of a subset of the available data. The comparison may be performed periodically for overlapping windows. At least some overlap in the windows of data used for the comparison ensures the differences between neighbouring calculated longitudinal offset values are smoothed over the data. The window may have a length sufficient for the accuracy of the offset calculation to be invariant to transient features, preferably the length being at least 100 m. Such transient features may be, for example, parked vehicles, overtaking vehicles or vehicles travelling the same route in the opposite direction. In some embodiments, the length is at least 50 m. In some embodiments, the length is 200 m. In this way, the sensed environment data is determined for a longitudinal stretch of road, the 'window', e.g. 200 m, and the resultant data is then compared to the localisation reference data for the stretch of road. By performing the comparison over a stretch of road of this size, i.e. one that is substantially larger than the length of the vehicle, non-stationary or temporary objects, such as other vehicles on the road, vehicles stopped on the side of the road, etc, will typically not impact the result of the comparison.

The real time scan data may be obtained using at least one range-finder sensor. The range-finder sensor may be configured to operate along a single axis. The range-finder sensor may be arranged to perform a scan in a vertical axis. When the scan is performed in the vertical axis, distance information for planes at multiple heights is collected, and thus the resultant scan is significantly more detailed. Alternatively, or in addition, the range-finder sensor may be arranged to perform a scan in a horizontal axis.

The range-finder sensor may be arranged to point in an outwards direction at substantially 90 degrees to the direction of travel of the vehicle. Thus, where multiple range-finder sensors are used, the comparison with the reference scan data may be carried out in a single comparison for all real time scan data acquired at the same time.

The range-finder sensor is configured to obtain data within an acquisition angle of between 50° and 90°. As used herein, the term acquisition angle means the total angular field of view of the range-finder sensor representing the maximum angular separation possible for two objects which are observable to the range-finder sensor. In some embodiments, the acquisition angle is substantially 70 degrees.

The range-finder sensor may be a laser scanner. The laser scanner may comprise a laser beam scanned across the lateral environment using at least one mirror. Thus, the laser scanner may be positioned away from the surface of the vehicle to protect the delicate component. In some embodiments, the mirror is actuated to scan the laser across the lateral environment. Thus, only a lightweight mirror need by physically rotated, and not the heavier laser scanner assembly.

At least a portion of the localisation reference data may be stored remotely. Preferably, at least a portion of the localisation reference data is stored locally on the vehicle. Thus, even though the localisation reference data is available throughout the route, it need not be continually transferred onto the vehicle and the comparison may be performed on the vehicle.

The localisation reference data may be stored in a compressed format. The localisation reference data may have a size that corresponds to 30 KB/km or less.

The localisation reference data may be stored for at least some, and preferably all, of the navigable elements of the navigable network represented in the digital map. Thus, the position of the vehicle can be continually determined anywhere along the route.

The reference scan may have been obtained from at least one device located on a mobile mapping vehicle which has previously travelled along the navigable element. Thus, the reference scan may have been acquired using a different vehicle than the current vehicle for which a position is being continually determined. In some embodiments, the mobile mapping vehicle is of a similar design to the vehicle for which the position is being continually determined.

In accordance with a second aspect of the present invention, there is provided a method of generating a reference scan associated with a digital map; the digital map comprising data representative of navigable elements (e.g. roads) of a navigable network (e.g. road network). The method comprises obtaining a reference scan of the lateral environment along at least one navigable element represented in the digital map; and determining actual positions of the reference scan throughout the reference scan.

Thus, in accordance with the second aspect of the present invention for at least one route in the digital map, a reference scan is obtained all along the route. This obtained reference data is suitable for using in any of the embodiments of the first aspect of the present invention.

The reference scan may be obtained on a left side of the navigable element and a right side of the navigable element. This helps to reduce the effect of transient features on a position estimation which may be performed using the generated reference scan. Such transient features may be, for example, parked vehicles, overtaking vehicles or vehicles travelling the same route in the opposite direction. Obviously, in this case, the transient features were present when the reference scan data was being acquired. Thus, reference scan can record features present on both sides of the route.

The reference scan data may be obtained using at least one range-finder sensor. The range-finder sensor may be configured to operate along a single axis. The range-finder sensor may be arranged to perform a scan in a vertical axis. When the scan is performed in the vertical axis, distance information for planes at multiple heights is collected, and thus the resultant scan is significantly more detailed. Alternatively, or in addition, the range-finder sensor may be arranged to perform a scan in a horizontal axis.

The range-finder sensor may be arranged to point in an outwards direction at substantially 90° to the direction of travel of the vehicle. Thus, where multiple range-finder sensors are used, the comparison with the reference scan data may be carried out in a single comparison for all real time scan data acquired at the same time.

The range-finder sensor may be configured to obtain data within an acquisition angle of between 50° and 90°. As used herein, the term acquisition angle means the total angular field of view of the range-finder sensor representing the maximum angular separation possible for two objects which are observable to the range-finder sensor. In some embodiments, the acquisition angle is substantially 70 degrees.

The range-finder sensor may be a laser scanner. The laser scanner may comprise a laser beam scanned across the lateral environment using mirrors. Thus, the laser scanner may be positioned away from the surface of the vehicle to protect the delicate component. In some embodiments, the mirror is actuated to scan the laser across the lateral environment. Thus, only a lightweight mirror need by physically rotated, and not the heavier laser scanner assembly. Additionally, or alternatively, the range-finder sensor may be radar scanner and/or a pair of stereo cameras.

The method may further comprise aligning the reference scan with the digital map based on the determined actual positions; and storing the reference scan in a database associated with the digital map. The actual positions may be determined from an absolute positioning system, such as a satellite navigation device, such as GPS, GLONASS, the European Galileo positioning system, COMPASS positioning system or IRNSS (Indian Regional Navigational Satellite System). It will be appreciated, however, that other location determining means can be used, such as using the mobile telecommunications, surface beacons or the like. The method may further comprise transmitting the reference scan and the determined actual positions to a server for subsequent alignment of the reference scan with the digital map based on the determined actual positions and storage in a database associated with the digital map.

In accordance with a third aspect of the present invention, there is provided a method of storing reference scan data associated with a digital map; the digital map comprising data representative of navigable elements (e.g. roads) of a navigable network (e.g. road network). The method comprises receiving localisation reference scan data obtained by scanning a lateral environment on both sides of a navigable element; and storing localisation reference data from each side of the navigable element in a single combined data set.

Thus, in accordance with the third aspect of the present invention, data from multiple parts of the navigable element may be stored together in an efficient data format. The data stored in the combined data set may be compressed, allowing data for more parts of the route to be stored within the same storage capacity. Data compression will also allow a reduced network bandwidth to be used should the reference scan data be transmitted to the vehicle over a wireless network connection.

The method may further comprise transmitting the single combined data set to a device for determining a longitudinal position of a vehicle.

In accordance with a fourth aspect of the present invention, there is provided a method of determining a longitudinal position of a vehicle relative to a digital map, the digital map comprising data representative of navigable elements of a navigable network along which the vehicle is travelling, the method comprising:

determining real time scan data by scanning a lateral environment around the vehicle using at least one range-finder sensor, said real time scan data comprising one or more depth maps, each depth map representing the measured lateral distance to surfaces in the lateral environment for a plurality of longitudinal positions and elevations;

retrieving localisation reference data associated with the digital map for a deemed current longitudinal position of the vehicle in relation to the digital map, wherein the localisation reference data comprises one or more depth maps, each depth map representing the lateral distance to surfaces in the lateral environment for a plurality of longitudinal positions and elevations;

comparing the real time scan data to the localisation reference data by calculating a cross-correlation to determine a longitudinal offset between the real time scan data and the localisation reference data; and adjusting the deemed current longitudinal position based on said longitudinal offset to determine the longitudinal position of the vehicle relative to the digital map.

The invention extends to a device, e.g. navigation device, vehicle, etc, having means, such as one or more processors arranged, e.g. programmed, to perform any of the methods described herein. The invention further extends to a non-transitory physical storage medium containing computer readable instructions executable to perform or cause a device to perform any of the methods described herein.

As will be appreciated by those skilled in the art, the aspects and embodiments of the present invention can, and preferably do, include any one or more or all of the preferred and optional features of the invention described herein in respect of any of the other aspects of the invention, as appropriate.

BRIEF DESCRIPTION OF THE DRAWINGS

Embodiments of the invention will now be described, by way of example only, with reference to the accompanying drawings, in which:

FIG. 5 shows a 3D view of data obtained from a laser scanner, while

FIG. 10A shows an example point cloud acquired by a range-finding sensor mounted to a vehicle travelling along a road, while

DETAILED DESCRIPTION OF THE FIGURES

Figure 1:
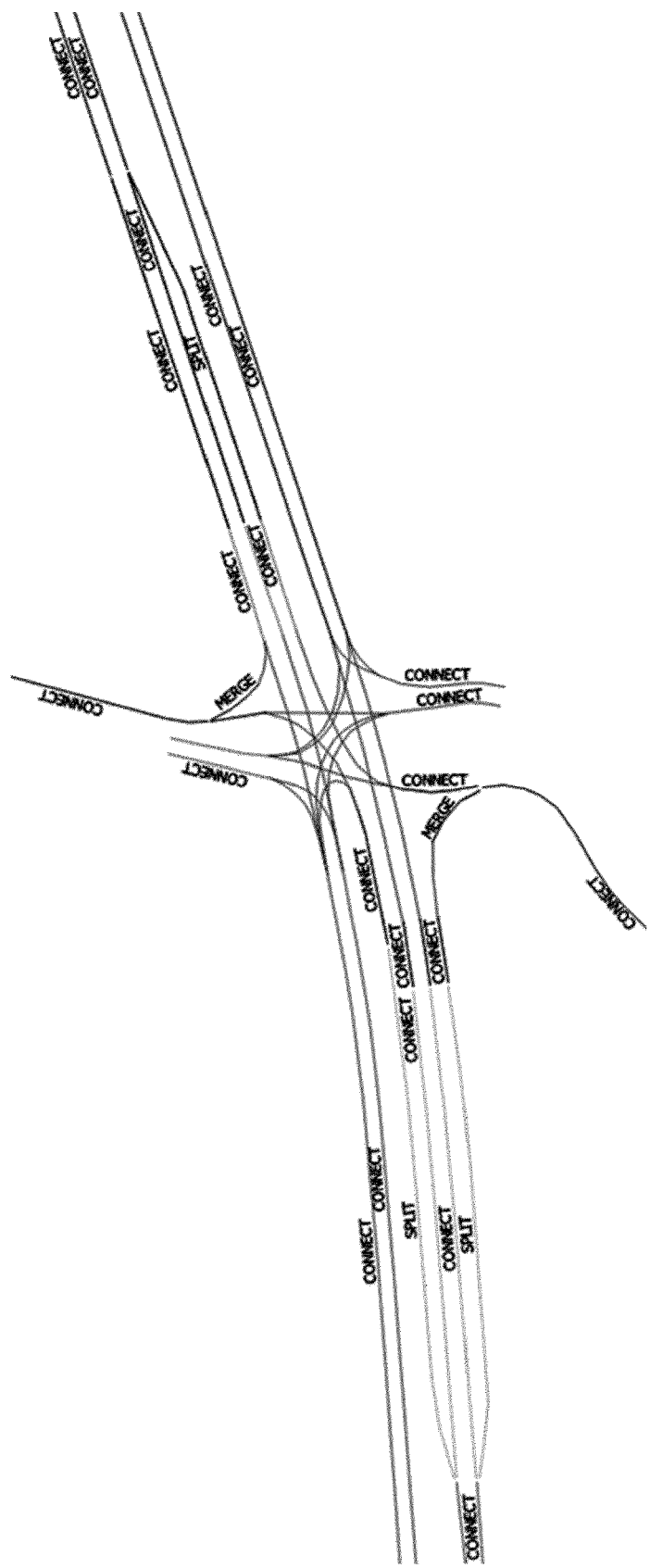
FIG. 1 is a representation of a portion of a planning map.
Figure 2:
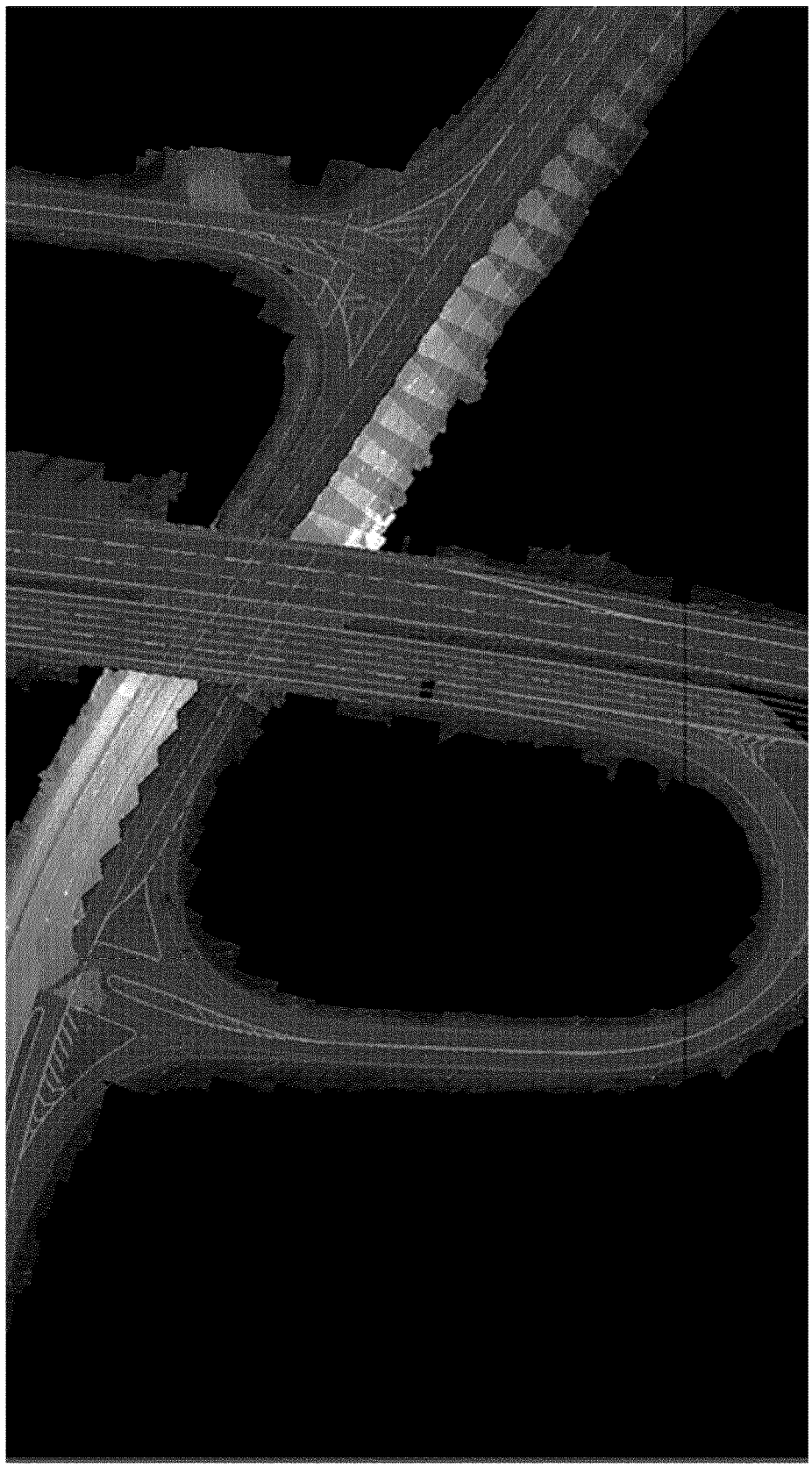
FIG. 2 shows a portion of a planning map overlaid on an image of a road network.

It has been recognised that an improved method for determining the position of a device, such as a vehicle, relative to a digital map (representative of a navigable network, e.g. road network) is required. In particular, it is required that the longitudinal position of the device relative to the digital map can be accurately determined, e.g. to sub-meter accuracy. The term "longitudinal" in this application refers to the direction along the portion of a navigable network on which the device, e.g. vehicle, is moving; in other words along the length of the road on which the vehicle is travelling. The term "lateral" in this application takes its normal meaning as being perpendicular to the longitudinal direction, and thus refers to the direction along the width of the road.

As will be appreciated, when the digital map comprises a planning map as described above, e.g. a three dimensional vector model with each lane of a road being representative separately (in contrast to relative to a centre line for the road as in standard maps), the lateral position of the device, e.g. vehicle, simply involves determining the lane in which the device is currently travelling. Various techniques are known for performing such a determination. For example, the determination can be made only using information obtained from the global navigation satellite system (GNSS) receiver. Additionally or alternatively, information from a camera, laser or other imaging sensor associated with the device can be used; for example substantial research has been carried out in recent years, in which image data from one or more video cameras mounted within a vehicle is analysed, e.g. using various image processing techniques, to detect and track the lane in which the vehicle is travelling. One exemplary technique is set out in the paper "Multi-lane detection in urban driving environments using conditional random fields" authored by Junhwa Hur, Seung-Nam Kang, and Seung-Woo Seo. published in the proceedings of the Intelligent Vehicles Symposium, page 1297-1302. IEEE, (2013). Here, the device may be provided with a data feed from a video camera, radar and/or lidar sensor and an appropriate algorithm is used to process the received data in real-time to determine a current lane of the device or the vehicle in which the device is travelling. Alternatively, another device or apparatus, such as a Mobileye system available from Mobileye N.V. may provide the determination of the current lane of the vehicle on the basis of these data feeds and then feed the determination of the current lane to the device, for example by a wired connection or a Bluetooth connection.

In embodiments, the longitudinal position of the vehicle can be determined by comparing a real-time scan of the environment around the vehicle, and preferably on one or both sides of the vehicle, to a reference scan of the environment that is associated with the digital map. From this comparison, a longitudinal offset, if any, can be determined, and the position of the vehicle matched to the digital map using the determined offset. The position of the vehicle relative to the digital map can therefore always be known to a high degree of accuracy.

The real-time scan of the environment around the vehicle can be obtained using at least one range-finder sensor that are positioned on the vehicle. The at least one range-finder sensor can take any suitable form, but in preferred embodiments comprises a laser scanner, i.e. a LiDAR device. The laser scanner can be configured to scan a laser beam across the environment and to create a point cloud representation of the environment; each point indicating the position of a surface of an object from which the laser is reflected. As will be appreciated, the laser scanner is configured to record the time it takes for the laser beam to return to the scanner after being reflected from the surface of an object, and the recorded time can then be used to determine the distance to each point. In preferred embodiments, the range-finder sensor is configured to operate along a single axis so as to obtain data within a certain acquisition angle, e.g. between 50-90°, such as 70°; for example when the sensor comprises a laser scanner the laser beam is scanned using mirrors within the device.

Figure 7:
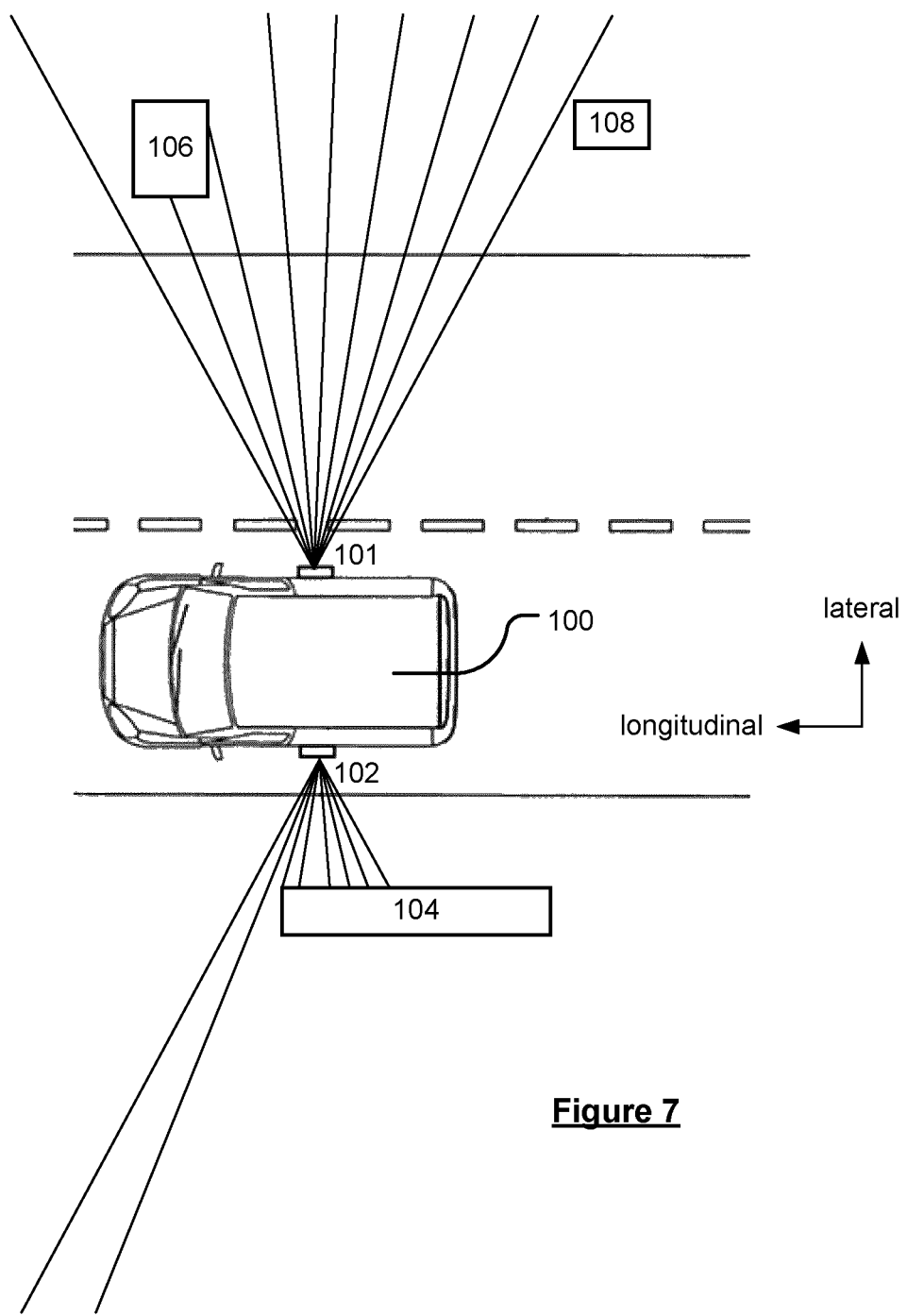
FIG. 7 shows a vehicle, in accordance with an embodiment, travelling along a road while sensing its surroundings.

An embodiment is shown in FIG. 7 in which a vehicle 100 is travelling along a road. The vehicle is equipped with a range-finder sensor 101, 102 positioned on each side of the vehicle. While a sensor is shown on each side of the vehicle, in other embodiments only a single sensor can be used on one side of the vehicle. Preferably, the sensors are suitably aligned such that the data from each sensor can be combined, as is discussed in more detail below.

Figure 6:
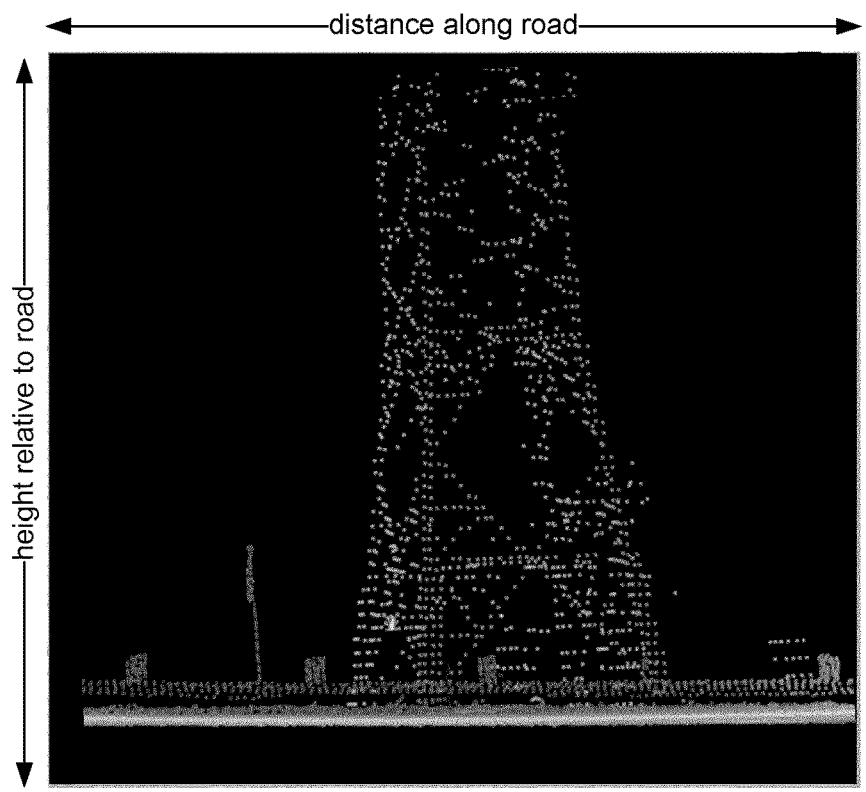
FIG. 6 shows a side view projection of the data obtained from the laser scanner.
Figure 8:
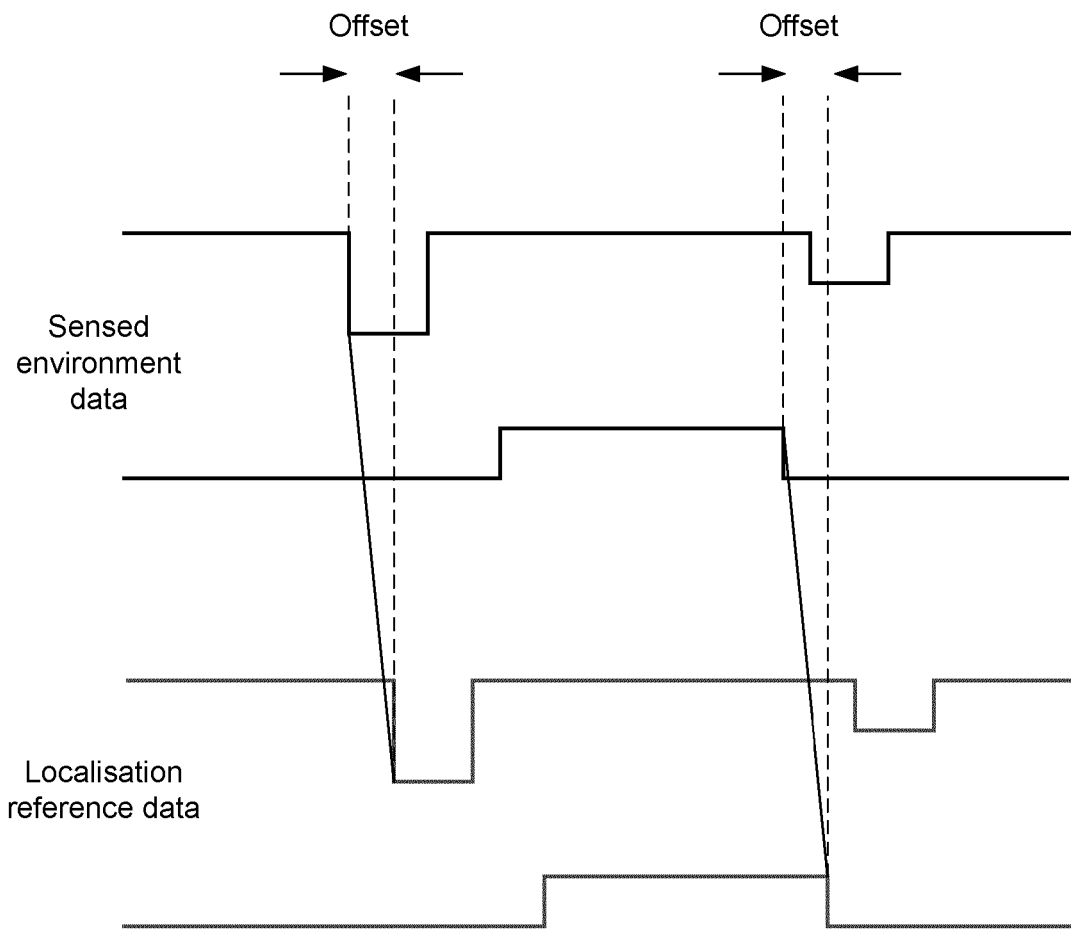
FIG. 8 shows a comparison of localisation reference data compared to sensed environment data, e.g. as collected by the vehicle of FIG. 7.

As discussed above, the range-finder sensor(s) can be arranged to operate along a single axis. In one embodiment, the sensor can be arranged to perform a scan in a horizontal direction, i.e. in a plane parallel to the surface of the road. This is shown, for example, in FIG. 7. By continually scanning the environment as the vehicle travels along the road, sensed environment data as shown in FIG. 8 can be collected. The data 200 is the data collected from the left sensor 102, and shows the object 104. The data 202 is the data collected from the right sensor 101, and shows the objects 106 and 108. In other embodiments, the sensor can be arranged to perform a scan in a vertical direction, i.e. in a plane perpendicular to the surface of the road. By continually scanning the environment as the vehicle travels along the road, it is possible to collect environment data in the manner of FIG. 6. As will be appreciated, by performing a scan in the vertical direction, distance information for planes at multiple heights is collected, and thus the resultant scan is significantly more detailed. It will of course be appreciated that the scan could be performed along any axis as desired.

The reference scan of the environment is obtained from one or more vehicles that have previously travelled along the road, and which is then appropriately aligned and associated with the digital map. The reference scans are stored in a database, which is associated with the digital map, and are referred to herein as localisation reference data. The combination of the localisation reference data when matched to a digital map can be referred to as a localisation map. As will be appreciated, the localisation map will be created remotely from the vehicles; typically by a digital map making company such as TomTom International B.V. or HERE, a Nokia company.

Figure 3:
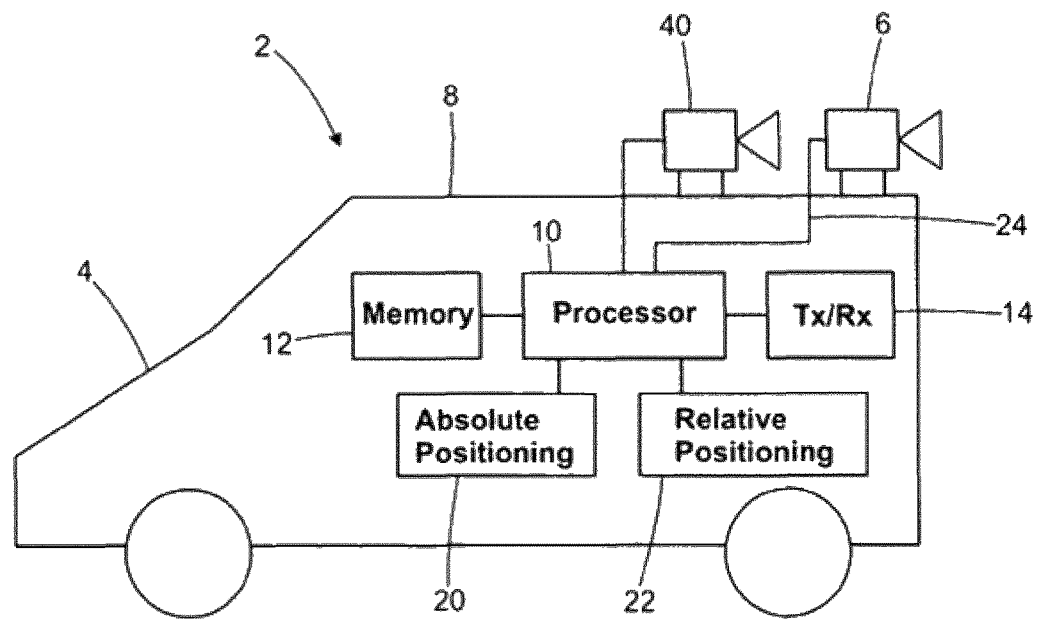
FIGS. 3 and 4 show an exemplary mobile mapping system that can be used to collect data for building maps.
Figure 4:
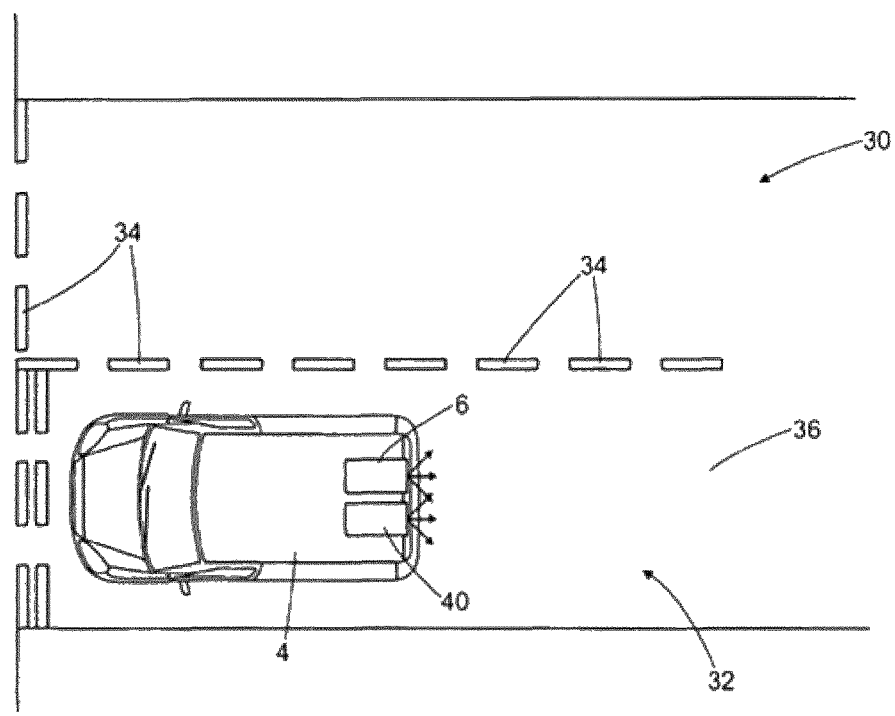
Figure 5:
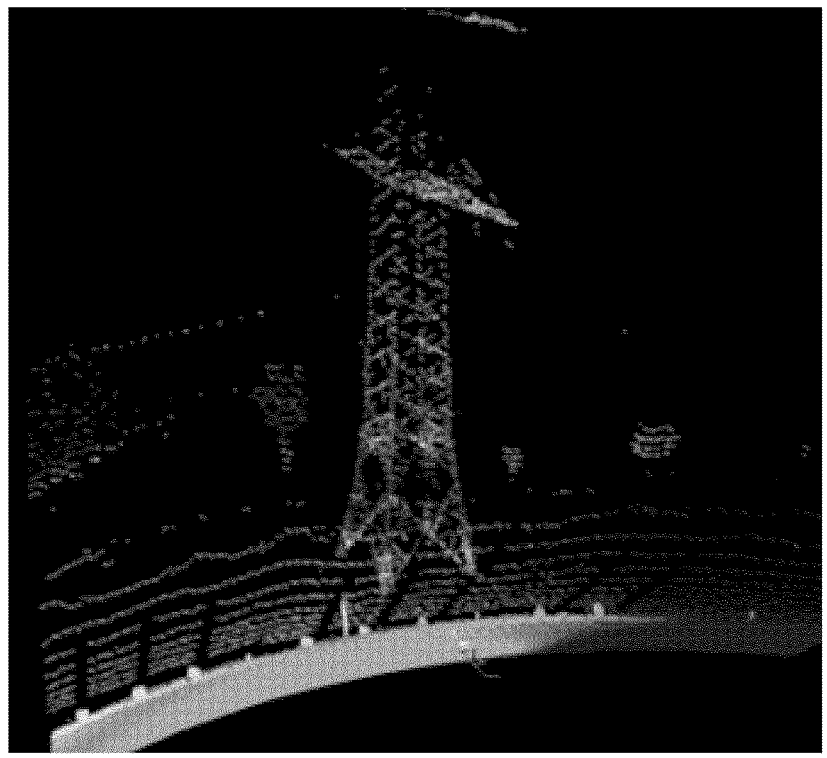

The reference scans can be obtained from specialist vehicles, such as mobile mapping vehicles, e.g. as shown in FIG. 3. In preferred embodiments, however, the reference scans can be determined from the sensed environment data that is collected by vehicles as they travel along the navigable network. This sensed environment data can be stored and periodically sent to the digital mapping company to create, maintain and update the localisation map.

The localisation reference data is preferably stored locally at the vehicle, although it will be appreciated that the data could be stored remotely. In embodiments, and particularly when the localisation reference data is stored locally, the data is stored in a compressed format.

In embodiments, localisation reference data is collected for each side of a road in the road network. In such embodiments, the reference data for each side of the road can be stored separately, or alternatively they can be stored together in a combined data set.

In embodiments, the localisation reference data can be stored as image data. The image data can be colour, e.g. RGB, images, or greyscale images.

Figure 9:
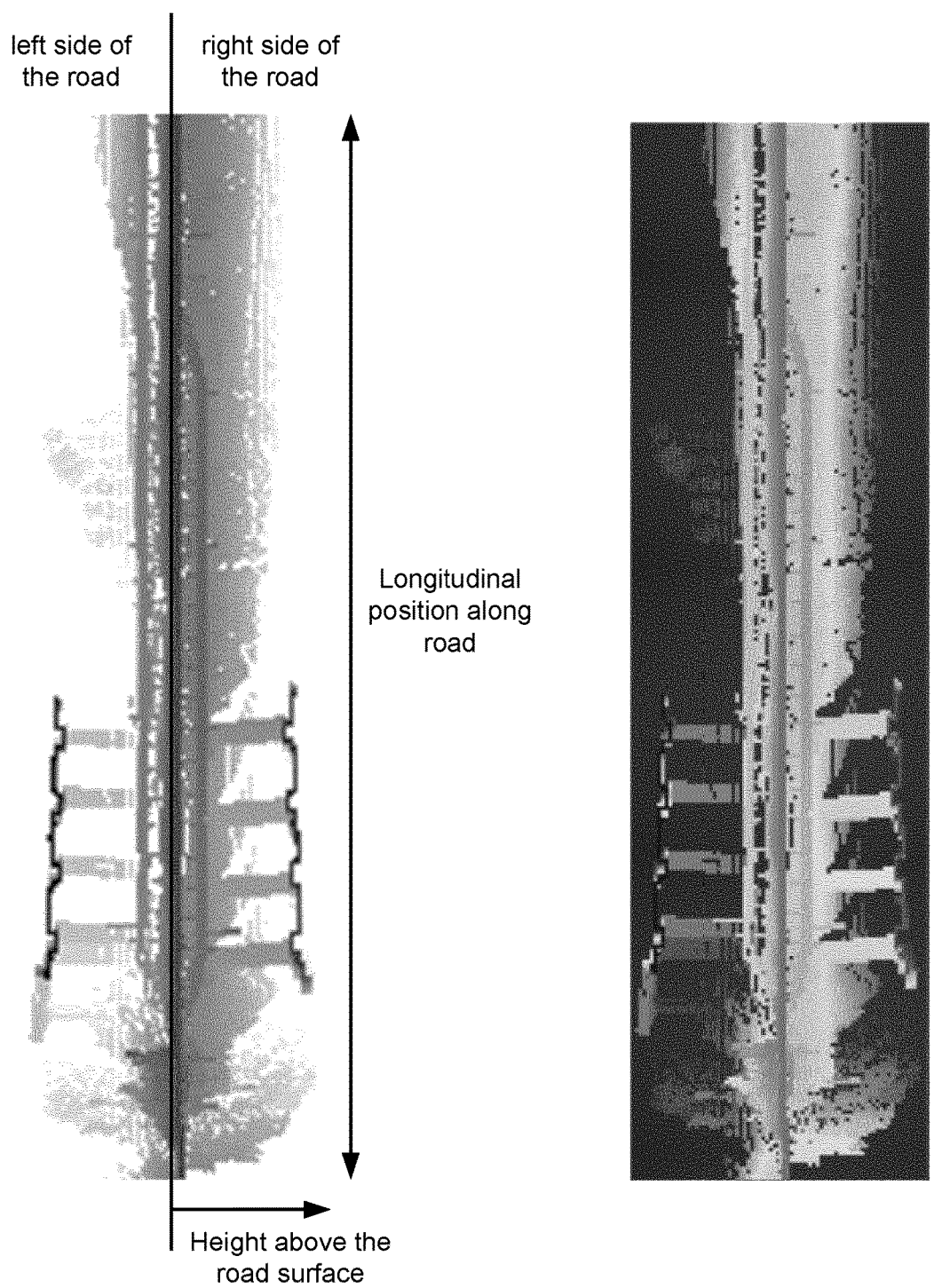
FIG. 9 shows an exemplary format of how localisation reference data can be stored.

FIG. 9 shows an exemplary format of how the localisation reference data can be stored. In this embodiment, the reference data for the left side of the road is provided on the left side of the image, and the reference data for the right side of the road is provided on the right side of the image; the data sets being aligned such that the left-side reference data set for a particular longitudinal position is shown opposite the right-side reference data set for the same longitudinal position.

In the image of FIG. 9, and for illustrative purposes only, the longitudinal pixel size is 0.5 m, there are 40 pixels on each side of the centreline. It has also been determined that the image can be stored as grayscale images, rather than the colour (RGB) images. By storing images in this format, the localisation reference data has a size that corresponds to 30 KB/km.

Figure 10A:
Figure 10B:
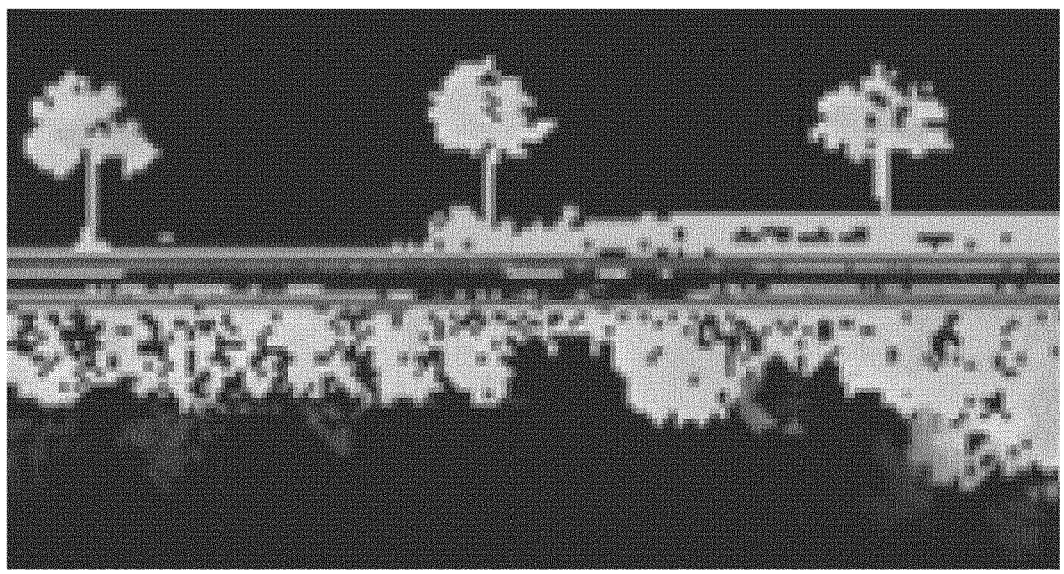
FIG. 10B shows this point cloud data having been converted into two depth maps.

A further example can be seen in FIGS. 10A and 10B. FIG. 10A shows an example point cloud acquired by a range-finding sensor mounted to a vehicle travelling along a road. In FIG. 10B, this point cloud data has been converted into two depth maps; one for the left side of the vehicle and the other for the right side of the vehicle, which have been placed next to each to form a composite image.

As discussed above, the sensed environment data determined by a vehicle is compared to the localisation reference data to determine if there is an offset. Any determined offset can then be used to adjust the position of the vehicle such that it accurately matched to the correct position on the digital map. This determined offset is referred to herein as a correlation index.

In embodiments, the sensed environment data is determined for a longitudinal stretch of road, e.g. 200 m, and the resultant data, e.g. image data, then compared to the localisation reference data for the stretch of road. By performing the comparison over a stretch of road of this size, i.e. one that is substantially larger than the length of the vehicle, non-stationary or temporary objects, such as other vehicles on the road, vehicles stopped on the side of the road, etc, will typically not impact the result of the comparison.

The comparison is preferably performed by calculating a cross-correlation between the sensed environment data and the localisation reference data, so as to determine the longitudinal positions at which the data sets are most aligned. The difference between the longitudinal positions of both data sets at maximum alignment allows the longitudinal offset to be determined. This can be seen, for example, by the offset indicated between the sensed environment data and localisation reference data of FIG. 8.

Figure 11:
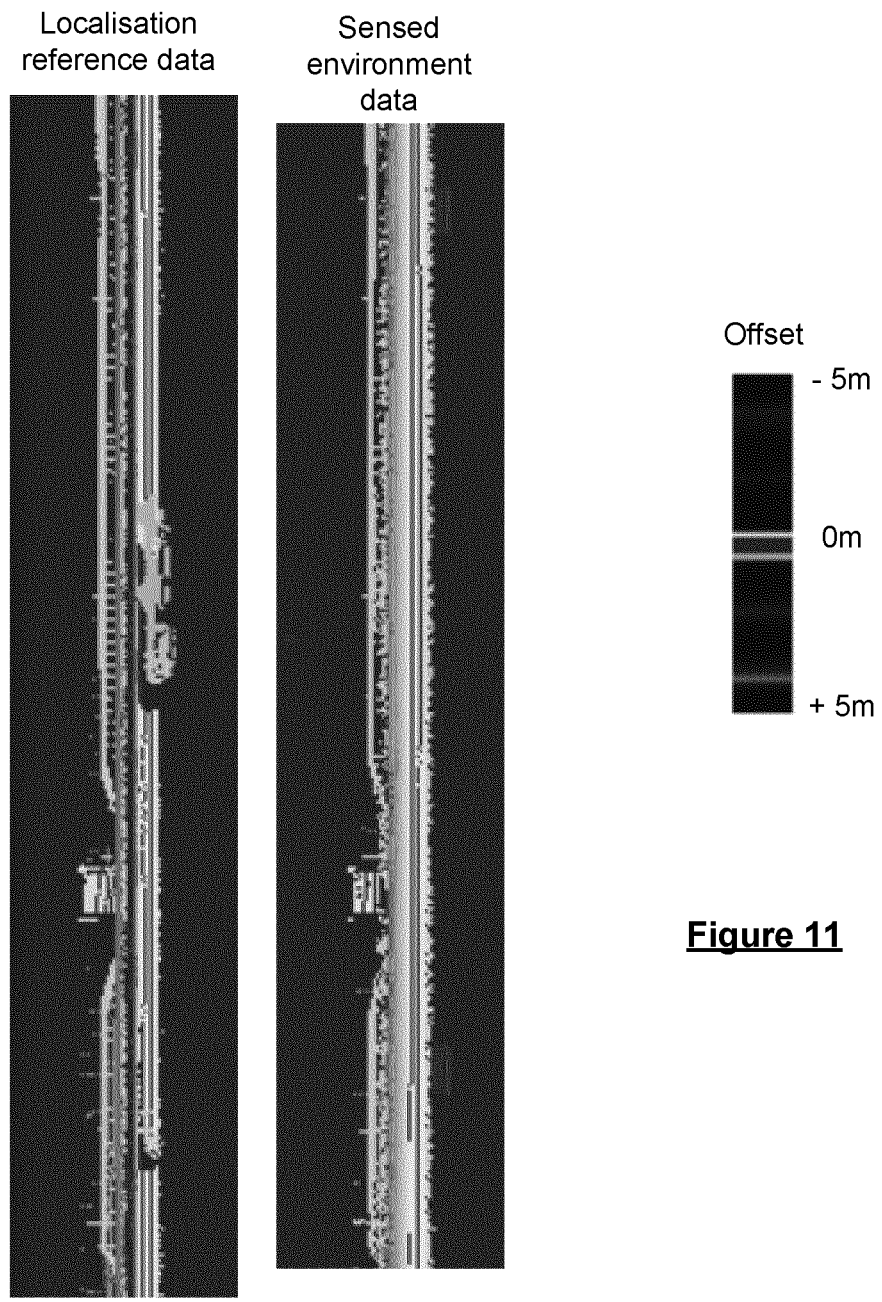
FIG. 11 shows the offset determined following a normalised cross-correlation calculation in an embodiment.

In embodiments, when the data sets are provided as images, the cross-correlation comprises a normalised cross-correlation operation, such that differences in brightness, lighting conditions, etc between the localisation reference data and the sensed environment data can be mitigated. Preferably, the comparison is performed periodically for overlapping windows, e.g. of 200 m lengths, so that any offset is continually determined as the vehicle travels along the road. FIG. 11 shows the offset determined, in an exemplary embodiment, following a normalised cross-correlation calculation between the depicted localisation reference data and the depicted sensed environment data.

Figure 12:
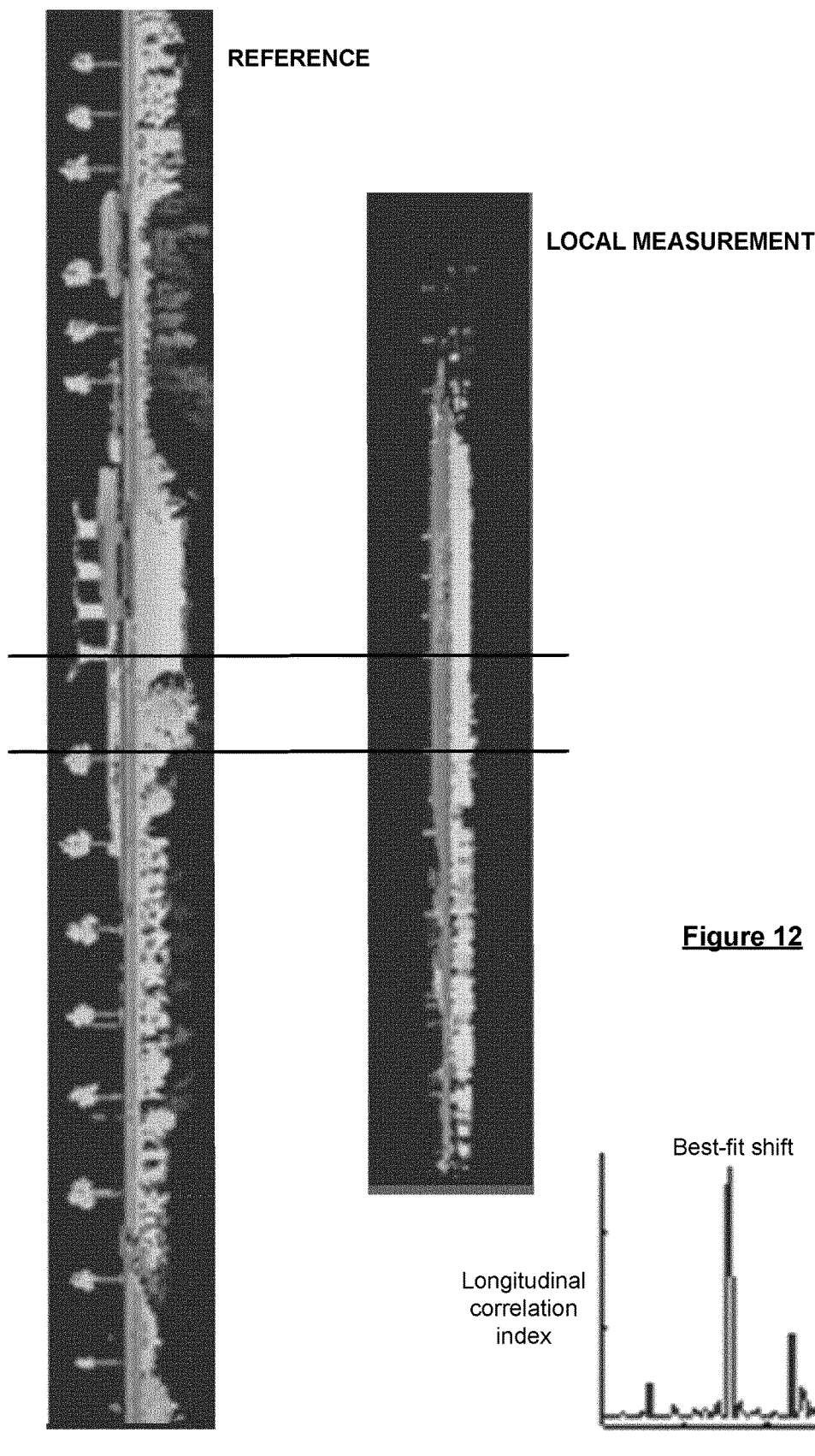
FIG. 12 shows another example of a correlation performed between a "reference" data set and a "local measurement" data set.

FIG. 12 illustrates a further example of a correlation performed between a "reference" data set and a "local measurement" data set (that is acquired by a vehicle as it travels along a road). The result of the correlation between the two images can be seen in the graph of "shift" against "longitudinal correlation index", wherein the position of the largest peak is used to determine the illustrated best-fit shift, which can then be used to adjust the longitudinal position of the vehicle relative to the digital map.

As can be seen from FIGS. 9, 10B, 11 and 12, the localisation reference data and the sensed environment data preferably are in the form of depth maps, wherein each element (e.g. pixel when the depth map is stored as an image) comprises: a first value indicative of a longitudinal position (along a road); a second value indicative of an elevation (i.e. a height above ground); and a third value indicative of a lateral position (across a road). Each element, e.g. pixel, of the depth map therefore effectively corresponds to a portion of a surface of the environment around the vehicle. As will be appreciated, the such that an element, e.g. pixel, will represent a larger surface area with a higher level of compression of the depth map (or image).

In embodiments, wherein the localisation reference data is stored in a data storage means, e.g. memory, of the device, the comparison step can be performed on one or more processors within the vehicle. In other embodiments, wherein the localisation reference data is stored remotely from the vehicle, the sensed environment data can be sent to a server over a wireless connection, e.g. via the mobile telecommunications network. The server, which has access to the localisation reference data, would then return any determined offset back to the vehicle, e.g. again using the mobile telecommunications network.

Figure 13:
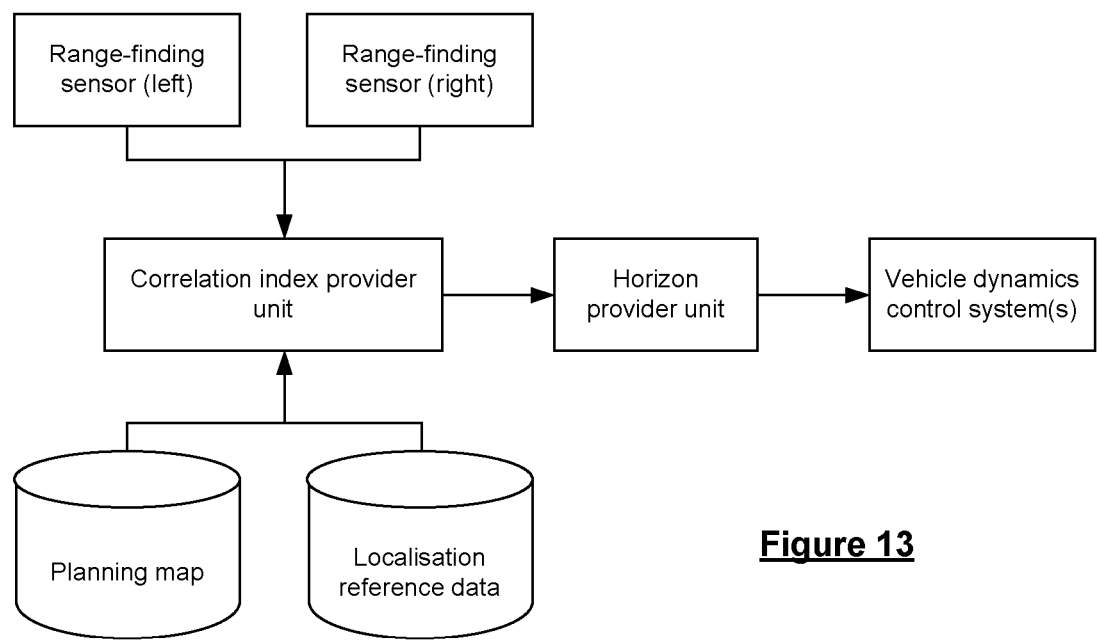
FIG. 13 shows an system positioned within a vehicle according to an embodiment.

An exemplary system, according to an embodiment of the invention, that is positioned within a vehicle is depicted in FIG. 13. In this system, a processing device referred to as a correlation index provider unit receives a data feed from a range-finding sensor positioned to detect the environment on the left side of the vehicle and a range-finding sensor positioned to detect the environment on the right side of the vehicle. The processing device also has access to a digital map (that is preferably in the form of a planning map) and a database of location reference data, which is suitably matched to the digital map. The processing device is arranged to perform the method described above, and thus to compare the data feed from the range-finding sensors, optionally after converting the data feed into a suitable form, e.g. an image data combining the data from both sensors, to localisation reference data to determine a longitudinal offset and thus accurate position the vehicle relative to the digital map. The system also comprises a horizon provider unit, and which uses the determined position of the vehicle and data within the digital map to provide information (referred to as a "horizon data") concerning the upcoming portion of the navigable network that the vehicle is about to traverse. This horizon data can then be used to control one or more systems within the vehicle to perform various assisted or automated driving operations, e.g. adaptive cruise control, automatic lane changing, emergency brake assistance, etc.

In summary, the invention relates, at least in preferred embodiments, to a positioning method based on longitudinal correlation. The 3D space around a vehicle is represented in the form of two depth maps, covering both the left and right sides of the road, and which may be combined into a single image. Reference images stored in a digital map are cross-correlated with the depth maps derived from lasers or other range-finding sensors of the vehicle to position the vehicle precisely along (i.e. longitudinally) the representation of the road in the digital map. The depth information can then be used, in embodiments, to position the car across (i.e. laterally) the road.

In a preferred implementation, the 3D space around a vehicle is projected to two grids parallel to road trajectory and the values of projections are averaged within each cell of the grid. A pixel of the longitudinal correlator depth map has dimensions of about 50 cm along the driving direction and about 20 cm height. The depth, coded by pixel value, is quantized with about 10 cm. Although the depth map image resolution along the driving direction is 50 cm, the resolution of positioning is much higher. The cross-correlated images represent a grid in which the laser points are distributed and averaged. Proper up-sampling enables finding shift vectors of sub-pixel coefficients. Similarly, the depth quantization of about 10 cm does not imply 10 cm precision of positioning across the road as the quantization error is mostly by laser precision and calibration, with only very little contribution from quantization error of longitudinal correlator index.

Accordingly, it will be appreciated, that the positioning information, e.g. the depth maps (or images), is always available (even if no sharp objects are available in the surroundings), compact (storing whole world's road network is possible), and enables precision comparable or even better than other approaches (due to its availability at any place and therefore high error averaging potential).

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of determining a longitudinal position of a vehicle relative to a digital map, the digital map comprising data representative of navigable elements of a navigable network along which the vehicle is travelling, the method comprising:

determining real time scan data by scanning a lateral environment around the vehicle using at least one range-finder sensor, said real time scan data comprising one or more depth maps, each depth map representing a measured lateral distance to surfaces in the lateral environment for a plurality of longitudinal positions and elevations;

retrieving localisation reference data associated with the digital map for a deemed current longitudinal position of the vehicle in relation to the digital map, wherein the localisation reference data comprises one or more depth maps in the form of images, each depth map representing, using corresponding pixel values in the image that comprise a first value indicative of a longitudinal position, a second value indicative of an elevation, and a third value indicative of a lateral position, a lateral distance to surfaces in the lateral environment for a plurality of longitudinal positions and elevations;

comparing the real time scan data to the localisation reference data by calculating a cross-correlation to determine a longitudinal offset between the real time scan data and the localisation reference data; and adjusting the deemed current longitudinal position based on said longitudinal offset to determine the longitudinal position of the vehicle relative to the digital map.

2. The method as claimed in claim 1, wherein the real time scan data is obtained by scanning the lateral environment on both on a left side of the vehicle and a right side of the vehicle so as to determine a depth map for the left side of the vehicle and a depth map for the right side of the vehicle that are combined into a composite image.

3. The method as claimed in claim 1, wherein the localisation reference data comprises a depth map representing the lateral distance to surfaces in the lateral environment on the left of the vehicle for a plurality of longitudinal positions and elevations and a depth map representing the lateral distance to surfaces in the lateral environment on the right of the vehicle for a plurality of longitudinal positions and elevations.

4. The method as claimed in claim 3, wherein the depth map representing the lateral distance to surfaces in the lateral environment on the left of the vehicle for a plurality of longitudinal positions and elevations and the depth map representing the lateral distance to surfaces in the lateral environment on the right of the vehicle for a plurality of longitudinal positions and elevations are combined into a composite image.

5. The method as claimed in claim 4, wherein the real time scan data is obtained by scanning the lateral environment on both on a left side of the vehicle and a right side of the vehicle so as to determine a depth map for the left side of the vehicle and a depth map for the right side of the vehicle that are combined into a composite image, and the cross-correlation is calculated between the composite image of the real time scan data and the image of the localisation reference data.

6. The method as claimed in claim 1, wherein the one or more depth maps of the localisation reference data are stored as compressed images.

7. The method as claimed in claim 1, wherein the one or more depth maps of the localisation reference data are stored as greyscale images.

8. The method as claimed in claim 1, wherein the comparison of the real time scan data to the localisation reference data is performed using real time scan data obtained during a window of a predetermined longitudinal distance.

9. The method as claimed in claim 8, wherein the comparison is performed periodically for overlapping windows.

10. The method as claimed in claim 1, wherein the range-finder sensor comprises one or more of: a laser scanner; a radar scanner; and a pair of stereo cameras.

11. The method as claimed in claim 1, wherein the localisation reference data is stored locally in a memory of the vehicle.

12. A device for determining a longitudinal position of a vehicle relative to a digital map, the digital map comprising data representative of navigable elements of a navigable network along which the vehicle is travelling, the device comprising at least one processor and a memory with computer readable instructions executable by the at least one processor to cause the device to:

determine real time scan data by scanning a lateral environment around the vehicle using at least one range-finder sensor, said real time scan data comprising one or more depth maps, each depth map representing a measured lateral distance to surfaces in the lateral environment for a plurality of longitudinal positions and elevations;

retrieve localisation reference data associated with the digital map for a deemed current longitudinal position of the vehicle in relation to the digital map, wherein the localisation reference data comprises one or more depth maps in the form of images, each depth map representing, using corresponding pixel values in the images that comprise a first value indicative of a longitudinal position, a second value indicative of an elevation, and a third value indicative of a lateral position, a lateral distance to surfaces in the lateral environment for a plurality of longitudinal positions and elevations;

compare the real time scan data to the localisation reference data by calculating a cross-correlation to determine a longitudinal offset between the real time scan data and the localisation reference data; and adjust the deemed current longitudinal position based on said longitudinal offset to determine the longitudinal position of the vehicle relative to the digital map.

13. A non-transitory computer readable medium comprising computer readable instructions which, when executed by at least one processor of a device, cause the device to perform the method according to claim 12.

\* \* \* \* \*